(12) United States Patent
Kim et al.

(10) Patent No.: US 8,878,069 B2
(45) Date of Patent: Nov. 4, 2014

(54) CABLE SUPPORT FOR AUTOMOBILE

(75) Inventors: Kyungwoo Kim, Yokkaichi (JP); Yoshiaki Matsutani, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 568 days.

(21) Appl. No.: 13/258,266

(22) PCT Filed: Jan. 19, 2010

(86) PCT No.: PCT/JP2010/000269
§ 371 (c)(1),
(2), (4) Date: Sep. 21, 2011

(87) PCT Pub. No.: WO2010/109741
PCT Pub. Date: Sep. 30, 2010

(65) Prior Publication Data
US 2012/0292081 A1    Nov. 22, 2012

(30) Foreign Application Priority Data

Mar. 27, 2009   (JP) .................................. 2009-080525

(51) Int. Cl.
| | | |
|---|---|---|
| *H01B 7/00* | (2006.01) | |
| *H01B 17/26* | (2006.01) | |
| *H01B 17/58* | (2006.01) | |
| *H01B 17/00* | (2006.01) | |
| *H02G 3/18* | (2006.01) | |
| *H01R 13/58* | (2006.01) | |
| *F16C 1/22* | (2006.01) | |
| *F16C 1/26* | (2006.01) | |
| *F16L 3/08* | (2006.01) | |
| *H02G 3/32* | (2006.01) | |
| *B60R 16/02* | (2006.01) | |

(52) U.S. Cl.
CPC .............. B60R 16/0215 (2013.01); H02G 3/32 (2013.01)
USPC ....... 174/135; 174/153 G; 174/156; 174/662; 174/664; 439/449; 74/502.6; 248/65

(58) Field of Classification Search
CPC ... B60R 16/0207; B60R 16/0215; H02G 3/32
USPC ........ 174/72 A, 74 R, 81, 82, 87, 91, 93, 135, 174/138 R, 150 S, 150, 153 G, 154, 156, 157, 174/158 R, 160, 161 R, 162, 163 R, 166 R, 174/167, 174, 654, 662, 664; 24/115 R, 24/129 D, 130; 439/449, 456, 459, 464, 439/471; 74/502.4, 502.6; 248/56, 65
See application file for complete search history.

(56) References Cited

U.S. PATENT DOCUMENTS 746,178 A  * 12/1903 Seaman ......................... 174/135
860,189 A  *  7/1907 Chatfield ....................... 174/135
(Continued)

FOREIGN PATENT DOCUMENTS

| JP | U-58-93088 | 6/1983 | |
|---|---|---|---|
| JP | U-59-16189 | 1/1984 | |
| JP | U-60-99588 | 7/1985 | |
| JP | A-63-178713 | 7/1988 | |
| JP | A-08-275343 | 10/1996 | |
| JP | 11089054 A  * | 3/1999 | ............... H02G 3/22 |

OTHER PUBLICATIONS

Machine Translation of Kondo (JP 11089054A) provided with Office Action.*
Original Kondo (JP 11089054A) provided with Office Action.*
International Search Report issued in International Application No. PCT/JP2010/000269 on Mar. 9, 2010 (with translation).

*Primary Examiner* — Chau N Nguyen
*Assistant Examiner* — Roshn Varghese
(74) *Attorney, Agent, or Firm* — Oliff PLC

(57) ABSTRACT

A cable support for an automobile allows a cable installed in a bent U-turn shape to be readily positioned and supported on a vehicle body or the like in a reliable manner. Two portions of a cable folded in a U-turn shape are inserted into a common insertion hole in a main body tube. The two portions of the cable folded in a U-turn shape are respectively inserted into independent insertion holes separately provided to a branching tube that is integral with the main body tube.

6 Claims, 2 Drawing Sheets

(56) References Cited

U.S. PATENT DOCUMENTS

| | | | |
|---|---|---|---|
| 2,289,992 A * | 7/1942 | Petersen | 174/135 |
| 4,763,541 A * | 8/1988 | Spease | 74/500.5 |
| 5,257,763 A * | 11/1993 | Nakamura | 248/56 |
| 6,133,527 A * | 10/2000 | Park et al. | 174/650 |
| 6,494,523 B2 * | 12/2002 | Kobayashi | 174/113 R |
| 6,889,574 B2 * | 5/2005 | Meyer | 74/502.6 |
| 7,029,194 B2 * | 4/2006 | Ishikawa et al. | 74/502.4 |

* cited by examiner

CABLE SUPPORT FOR AUTOMOBILE

CROSS-REFERENCE TO RELATED APPLICATIONS

This is a national stage application filed under 35 U.S.C. §371 claiming priority to International Application No. PCT/JP2010/000269 filed in Japan on Jan. 19, 2010, which claims priority to Japanese Application No. JP2009-080525 filed in Japan on Mar. 27, 2009, the disclosures of which are incorporated herein by reference in their entireties.

BACKGROUND

The present invention relates to a cable support for an automobile used for a conducting cable to be supported on a supporting member, such as a vehicle body, and more particularly, to a cable support for an automobile used to support a U-turn shaped folded portion of a cable.

A large number of cables are installed to an automobile for energization of various electric components. For these cables, routing is designed so as not to cause trouble in running or use of the automobile and the cables are positioned while being supported on a supporting member, such as a vehicle body.

Incidentally, the cables are subjected to vibrations and heat while the automobile is running. In such severe environments, it is necessary for the cables to be supported on the supporting member, such as a vehicle body, in a reliable manner.

To this end, there has been proposed a special cable support for a cable to be supported on the vehicle body. For example, JP-A-63-178713 discloses a cable support having a structure in which a protective sleeve is externally engaged to a cable and a fixing bracket wound around the protective sleeve is bolted to a vehicle body.

However, when a cable folded in a U-turn shape is installed, it is difficult for the folded portion to be supported on the supporting member in a reliable manner by the cable support described in JP-A-63-178713. More specifically, cables are routed in various manners and cables have straight portions and U-turn shaped folded portions. With the cable support described in JP-A-63-178713, however, there is no choice but to allow only one of the straight portions extending from the folded portion to be supported on the supporting member. This cable support therefore fails to prevent the other non-supported straight portion from undergoing displacement or deformation. Accordingly, interference with other members and damage caused by considerable deformation may possibly pose a problem.

When a cable folded in a U-turn shape is installed, the cable may be supported in the two straight portions extending from the folded portion using the cable supports individually. However, because two cable supports have to be attached, there arises a problem that a work becomes tedious and takes time. Moreover, because an attachment space is necessary for each of the two cable supports, there arises another problem that it is difficult to secure spaces in the supporting member, such as a vehicle body.

SUMMARY

The invention was devised in view of the foregoing and solves the problems by providing a cable support for an automobile having a novel structure and allowing a cable for an automobile installed in a bent U-turn shape to be readily positioned and supported on a vehicle body or the like in a reliable manner.

Hereinafter, configurations of the invention devised to solve the problems discussed above will be described. It should be appreciated that components adopted in respective configurations below can be combined arbitrarily where possible.

According to the invention, a cable support for an automobile is attached to a portion where an automobile cable folded in a U-turn shape is installed to allow the cable to be supported on a supporting member, such as a vehicle body. The cable support for an automobile is characterized by including a covering member having (i) a main body tube provided with a common insertion hole of a size large enough to insert two cables and (ii) a branching tube formed integrally with the main body tube so as to extend outward from an opening on a side opposite to a side where the cable is folded and provided with independent insertion holes in parallel, of a size large enough to insert one cable.

With the cable support for an automobile having the structure of the invention, the two straight portions of a cable folded in a U-turn shape brought into a close proximity to each other are inserted into the common insertion hole in the main body tube. Owing to this configuration, should the entire cable be pulled, the folded portion bulged by rigidity of the cable per se is caught on the main body tube. It thus becomes possible to prevent displacement of the entire cable.

Also, the two straight portions of the cable folded in a U-turn shape are respectively inserted into the independent insertion holes separately provided to the branching tube. Hence, should one straight portion alone be pulled, it becomes possible to prevent a pull force from being exerted also on the other straight portion to consequently pull both the straight portions in a fall-off direction at the same time. Accordingly, should a large pull force be exerted on one straight portion alone, it becomes possible to avoid the pull force from acting as a force that causes the entire cable to undergo displacement.

Further, because the independent insertion holes are provided separately to the branching tube, any further displacement of the cable in the fall-off direction can be prevented at a branching portion of the respective independent insertion holes. It is therefore possible to avoid an event that the U-turned portion of the cable being supported by the cable support for an automobile falls off completely. Quite high reliability can be thus achieved in terms of supporting the cable.

In addition, because the U-turned portion of the cable can be effectively supported by the single cable support for an automobile, not only does it become possible to facilitate an operation to attach the cable support for an automobile to the supporting member, but it also becomes possible to secure an attachment space of the cable support for an automobile in the supporting member efficiently.

It is preferable for the cable support for an automobile to further include a locking portion provided to the supporting member for the main body tube to be locked. It should be appreciated, however, that the locking portion may be formed of a separate bracket and fixed to the supporting member, such as a vehicle body, by an arbitrary method, such as welding and a bolt, or the locking portion may be provided to another member provided to the supporting member. Alternatively, the locking portion may be provided integrally with the supporting member.

In a case where the locking portion having the structure as above is adopted, it is preferable to adopt a configuration in which a locking groove extending in a circumferential direction is provided to an outer circumferential surface of the main body tube and a fitting hole opening at one point on a periphery is provided to the locking portion, so that the covering member is locked to the locking portion as the main body tube is fit into the fitting hole and an inner peripheral rim of the fitting hole is fit in and locked to the locking groove. Owing to this configuration, a locking state of the locking portion to the covering member can be readily achieved.

Further, the invention may adopt a configuration in which the branching tube is formed of two cylindrical bodies each independently extending from the main body tube in the covering member. When configured in this manner, it becomes possible to set a large degree of freedom, such as displacement, deformation, and an installation direction of the two straight portions of the cable folded in a U-turn shape. Also, it becomes possible to suppress an adverse effect of inserting one of the two straight portions given to insertion of the other straight portion. An example of such an adverse effect is that the independent insertion hole for the other straight portion undergoes deformation that reduces the diameter following the insertion of one straight portion and it becomes difficult to insert the other straight portion.

DETAILED DESCRIPTION OF EMBODIMENTS

Figure 1:
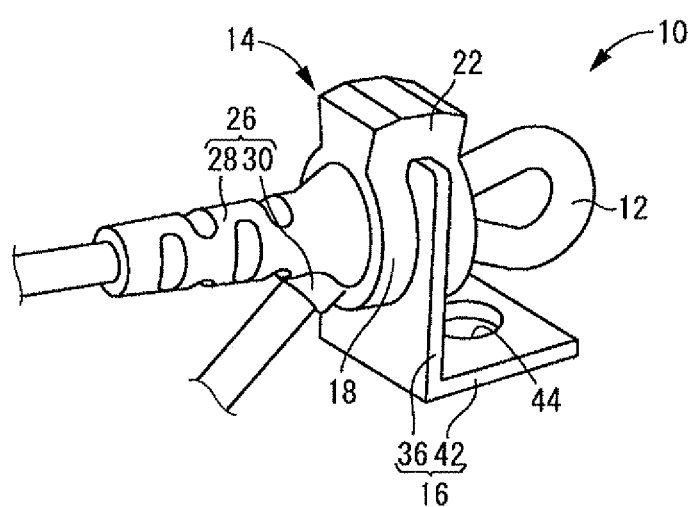
FIG. 1 is a perspective view showing a cable support for an automobile according to one embodiment of the invention.
Figure 2:
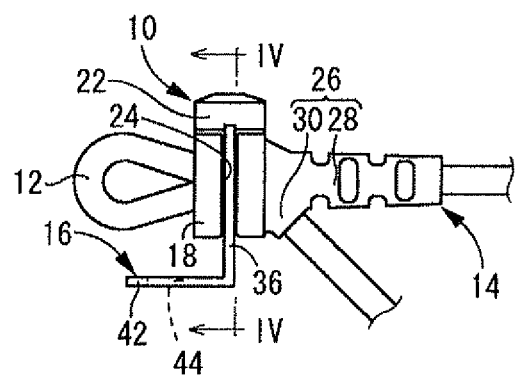
FIG. 2 is a side view of the cable support for an automobile.
Figure 3:
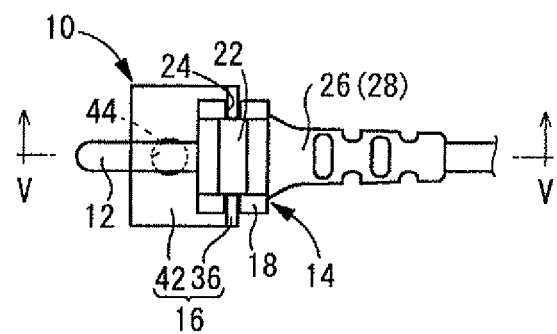
FIG. 3 is a plan view of the cable support for an automobile.
Figure 4:
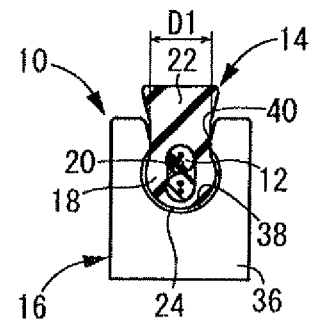
FIG. 4 is a cross section taken on line IV-IV of FIG. 2.
Figure 5:
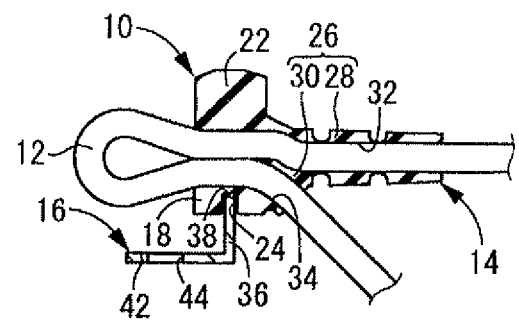
FIG. 5 is a cross section taken on line V-V of FIG. 3.

Hereinafter, in order to make the invention more specific, an embodiment of the invention will be described in detail with reference to the drawings.

FIG. 1 through FIG. 5 show a cable support 10 for an automobile according to an embodiment of the invention. The cable support 10 for an automobile includes a covering member 14 that holds a sensor cable 12 as a cable folded in a U-turn shape. The covering member 14 is attached to a locking portion 36 (described below) provided to a bracket 16 fixed to a supporting member (not shown), such as a vehicle body. Owing to this configuration, the sensor cable 12 is supported on the supporting member.

More specifically, the covering member 14 is made of elastomer, such as crosslinked natural rubber or synthetic rubber, or synthetic resin and includes a main body tube 18. The main body tube 18 is of a thick circular block shape as a whole and provided with a common insertion hole 20 at the center. The common insertion hole 20 is of a size large enough to insert two straight portions of the sensor cable 12 folded in a U-turn shape in a state where the two straight portions are arranged to be in contact with each other side by side.

A pressing protrusion 22 protruding outward along the radius is provided to the main body tube 18 on the outer circumferential surface at one point on the periphery. Further, a free end of the pressing protrusion 22 is wider than the end of the pressing protrusion 22 that is connected to the main body tube 18. This configuration facilitates an operation to press the pressing protrusion 22.

Furthermore, a locking groove 24 extending in a circumferential direction is provided to the main body tube 18 on the outer circumferential surface in a portion excluding the position at which the pressing protrusion 22 is provided. Both circumferential ends of the locking groove 24 are open in the protruding direction of the pressing protrusion 22.

Also, a branching tube 26 is formed integrally with the main body tube 18 at one opening of the common insertion hole 20 so as to extend outward. The branching tube 26 has a structure in which two cylindrical bodies 28 and 30 independently extending from the main body tube 18 are formed integrally by sharing a part of the tube wall. The cylindrical bodies 28 and 30 are provided with independent insertion holes 32 and 34, respectively. The independent insertion holes 32 and 34 extend in directions different from each other. It thus becomes possible to direct the sensor cable 12 inserted into the independent insertion holes 32 and 34 in a desired direction. Hence, interference with other components can be avoided advantageously when installing the sensor cable 12.

In the covering member 14 configured as above is stored the sensor cable 12 folded in a U-turn shape with the U-turn shaped folded portion protruding from the other opening of the common insertion hole 20 in the main body tube 18. Two straight portions of the folded sensor cable 12 are inserted into the common insertion hole 20 in the main body tube 18. One of the two straight portions is inserted into the independent insertion hole 32, which is one of the independent insertion holes provided to the branching tube 26, and the other straight portion is inserted into the other independent insertion hole 34. The two straight portions inserted into the common insertion hole 20 are stored while one is disposed on top of the other under the pressing protrusion 22. This stored condition of the sensor cable 12 in the covering member 14 may be achieved by inserting the sensor cable 12 sequentially into the respective insertion holes (the common insertion hole 20 and the independent insertion holes 32 and 34) provided to the covering member 14. Alternatively, a slit may be provided to the main body tube 18, so that the two straight portions of the sensor cable 12 are fit into the common insertion hole 20 through the slit. Further, the stored condition may be achieved by integrally molding the covering member 14 and the sensor cable 12 by setting the two straight portions of the sensor cable 12 into a molding cavity and applying insert molding.

Meanwhile, the bracket 16 is made of a hard material, such as metal or hard synthetic resin, and includes the locking portion 36 locked to the main body tube 18 of the covering member 14. The locking portion 36 is of a rectangular plate shape as a whole and provided with a circular fitting hole 38 penetrating through the locking portion 36 in the thickness direction at the center.

Also, the locking portion 36 is provided with a notch 40. Owing to this configuration, the fitting hole 38 opens to the outer circumferential surface of the locking portion 36 at one point on the periphery. In this embodiment, a clearance dimension of a peripheral opening portion (a region in which the notch 40 is provided) of the fitting hole 38 increases with a distance toward the outside along the radius direction of the fitting hole 38. It thus becomes possible to position the locking portion 36 and the main body tube 18 readily as will be described below. The clearance dimension in the opening of the fitting hole 38, D1, is narrowed and made slightly smaller than an inside diameter dimension of the locking groove 24 in the main body tube 18.

A fixing portion 42 fixed to the supporting member is formed integrally with the locking portion 36 in an upright state with respect to the locking portion 36 on the edge opposite to the edge where the notch 40 is provided. The fixing portion 42 is of a rectangular plate shape as a whole and provided with a bolt insertion hole 44 at the center. The bracket 16 is fixed to the supporting member at the fixing portion 42 with a fixing bolt inserted into the bolt insertion hole 44.

The covering member 14 is attached to the bracket 16 configured as above in the following manner. Initially, the bottom surface of the locking groove 24 in the main body tube 18 of the covering member 14 is abutted on the opening of the fitting hole 38 in the locking portion 36 of the bracket 16. By pressing the pressing protrusion 22 from this state to fit the locking groove 24 in the main body tube 18 into the fitting hole 38, the main body tube 18 of the covering member 14 is locked to the locking portion 36 of the bracket 16.

In this embodiment, the opening of the fitting hole 38 is narrowed so that the clearance dimension thereof, D1, is made slightly smaller than the inside diameter dimension of the locking groove 24 in the main body tube 18. Accordingly, the narrowing effect makes it possible to prevent the main body tube 18 locked in the fitting hole 38 from falling off. Also, because the sensor cable 12 is stored in the common insertion hole 20 while one of the two straight portions is placed on top of the other under the pressing protrusion 22, which is the direction in which the main body tube 18 is pressed into the fitting hole 38, it becomes possible to achieve a fitting structure of the bracket 16 and the covering member 14 while avoiding an increase in size of the fitting hole 38 and hence the bracket 16.

With the cable support 10 for an automobile having the structure as above, two straight portions of the sensor cable 12 folded in a U-turn shape are inserted into the common insertion hole 20 in the main body tube 18 while abutting on each other. Owing to this configuration, should a pull force be exerted on the sensor cable 12 in a fall-off direction, a portion of the sensor cable 12 folded in a U-turn shape is caught on the main body tube 18. It thus becomes possible to support the sensor cable 12 in a stable manner.

Also, the two straight portions inserted into the common insertion hole 20 in the main body tube 18 are respectively inserted into the independent insertion holes 32 and 34 provided to the branching tube 26. Hence, should a pull force be exerted on one straight portion alone, it becomes possible to prevent the pull force from being exerted also on the other straight portion to consequently pull both the straight portions in the fall-off direction at the same time.

Further, the two straight portions are respectively inserted into the independent insertion holes 32 and 34. Hence, should the two straight portions be pulled in the fall-off direction to cause the folded portion to come into the common insertion hole 20, it becomes possible to prevent any further displacement in the fall-off direction at the branching portion of the respective independent insertion holes 32 and 34 in the branching tube 26.

Moreover, because the two straight portions are supported by the single cable support 10 for an automobile, not only does it become possible to facilitate an attachment operation to the supporting member, but it also becomes possible to secure an attachment space in the supporting member efficiently.

In addition, the branching tube 26 that regulates the direction of the sensor cable 12 and the main body tube 18 necessary for the fixing to the supporting member are formed integrally. Hence, because no fixing components other than the bracket 16 are used, a reduction in cost and weight can be achieved.

Also, in this embodiment, the peripheral opening of the fitting hole 38 is pressed against the bottom surface of the locking groove 24 provided to the main body tube 18. It thus becomes possible to ensure a sufficient fixing strength of the bracket 16 to the covering member 14.

While one embodiment of the invention has been described in detail, it should be appreciated that, for example, the locking structure of the covering member 14 to the bracket 16 is not limited to the one described above. For example, both may be fixed to each other by winding, or the covering member 14 may be deformed and clipped.

Further, the locking portion 36 is formed of the bracket 16, which is a separate body. It should be appreciated, however, that the fixing structure of the bracket 16 to the supporting member is not limited to the bolting described above. For example, known fixing means, such as welding and riveting, are also available.

Furthermore, the covering member 14 may have a divided structure. For example, the covering member 14 may be formed of a pair of divided structures divided along the cross section taken on line V-V of FIG. 3.

In addition, the main body tube 18 has a thick circular block shape as a whole. It should be appreciated, however, that the main body tube 18 may adopt a rectangular block shape or any other arbitrary shape. Likewise, the fitting hole 38 may adopt an arbitrary shape, such as a rectangle, as long as the locking groove 24 in the main body tube 18 can be fit therein.

Figure 6:
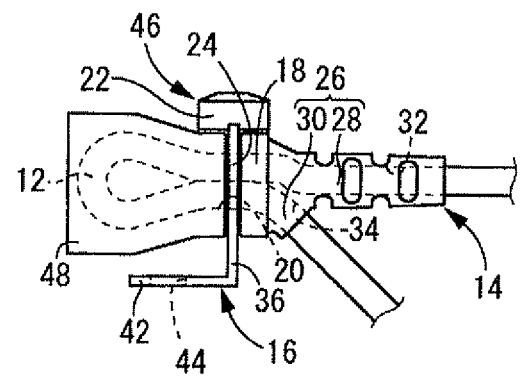
FIG. 6 is a side view showing another configuration of the cable support for an automobile adoptable in the invention.

In the embodiment above, the folded portion of the sensor cable 12 protrudes from the covering member 14. It should be appreciated, however, that a tip end cover to cover the folded portion may be provided. The tip end cover may be formed separately from the cable support of the invention or may be formed integrally with the cable support as is shown, for example, in FIG. 6. More specifically, in a cable support 46 shown in FIG. 6, the branching tube 26 is formed integrally with the main body tube 18 at one opening while a tip end cover 48 is formed integrally with the main body tube 18 at the other opening. The folded portion of the sensor cable 12 is covered entirely by the tip end cover 48. The cable support 46 having the integrally formed tip end cover 48 can be manufactured, for example, by setting the folded portion of the sensor cable 12 in a molding cavity and applying insert molding.

The embodiment above has described a support of the sensor cable 12 as an application example of the invention. It should be appreciated, however, that the invention is also applicable to a support of various conducting cables for an automobile, such as a wire harness

The invention claimed is:

1. An assembly, comprising:
    a supporting member;
    an automobile cable folded in a U-turn shape, such that two portions of the same cable are adjacent to each other; and
    a cable support, the cable support comprising:
    a covering member that comprises (i) a main body tube provided with a common insertion hole of a size large enough to insert two cables and (ii) a branching tube integral with the main body tube and extending outward from the common insertion hole, the branching tube including independent insertion holes each having a size large enough to insert one cable;
    wherein the two adjacent portions of the automobile cable are located in the common insertion hole and the independent insertion holes of the cable support, and the cable support is supported by the supporting member.

2. The assembly according to claim 1, wherein:
    a locking groove extending in a circumferential direction is provided to an outer circumferential surface of the main body tube, the locking groove being sized and shaped to engage with a fitting hole opening provided on an automobile.

3. The assembly according to claim 1, wherein:
the branching tube comprises two branch bodies each independently extending from the main body tube in the covering member, each independent insertion hole extending through a respective one of the branch bodies.

4. The assembly according to claim 1, further comprising:
a locking portion provided to the supporting member, the main body tube being locked by the locking portion.

5. The assembly according to claim 4, wherein:
a locking groove extending in a circumferential direction is provided to an outer circumferential surface of the main body tube;
a fitting hole opening at one point on a periphery is provided to the locking portion; and
the covering member is locked to the locking portion as the main body tube is fit into the fitting hole and an inner peripheral rim of the fitting hole is fit in and locked to the locking groove.

6. The assembly according to claim 4, wherein the locking portion is part of a bracket that is separate from, and attachable to, an automobile body.

* * * * *